(12) United States Patent
Baumgartner (10) Patent No.: US 10,286,564 B2
(45) Date of Patent: May 14, 2019

(54) SYSTEM FOR LOCALLY GENERATING ELECTRICITY ON A ROBOTIC DEVICE

(71) Applicant: Lincoln Global, Inc., Sante Fe Springs, CA (US)

(72) Inventor: Toby Baumgartner, Canal Winchester, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 198 days.

(21) Appl. No.: 15/583,028

(22) Filed: May 1, 2017

(65) Prior Publication Data

US 2018/0311835 A1 Nov. 1, 2018

(51) Int. Cl.
*B25J 19/00* (2006.01)
*H02K 7/00* (2006.01)
*H02K 7/18* (2006.01)

(52) U.S. Cl.
CPC .............. *B25J 19/005* (2013.01); *H02K 7/00* (2013.01); *H02K 7/1823* (2013.01)

(58) Field of Classification Search
CPC ........ B25J 19/005; H02K 7/00; H02K 7/1823
USPC .................................................. 700/245, 258
See application file for complete search history.

(56) References Cited

U.S. PATENT DOCUMENTS

| | | | | |
|---|---|---|---|---|
| 3,851,769 A | * | 12/1974 | Noguchi | B25J 9/00 414/730 |
| 4,645,084 A | * | 2/1987 | Deike | B25J 9/046 173/194 |
| 5,100,138 A | * | 3/1992 | Wilde | A63F 9/0252 273/440.1 |
| 5,210,378 A | * | 5/1993 | Tusques | B25J 19/0029 174/117 F |
| 5,777,267 A | * | 7/1998 | Szydel | B25J 19/0025 174/72 A |
| 8,485,125 B2 | | 7/2013 | Baumann | |
| 8,583,313 B2 | | 11/2013 | Mian | |
| 8,991,078 B1 | | 3/2015 | Harrington | |

(Continued)

FOREIGN PATENT DOCUMENTS

| | | |
|---|---|---|
| CN | 204823718 U | 12/2015 |
| EP | 2764323 B1 | 6/2016 |

(Continued)

OTHER PUBLICATIONS

"Wireless Control Revamps Truck-Scale Loading Equipment" by Leah Scully 2 (hydraulicspneumatics.com/blog/wireless-control-revamps-truck-scale-loading-equipment)—Sep. 30, 2016 (3 pages).

(Continued)

*Primary Examiner* — Jaime Figueroa
(74) *Attorney, Agent, or Firm* — Brad C. Spencer (57) ABSTRACT

A robotic device includes a robot arm. A fluid-powered tool is located on the robot arm. A hose supplies a pressurized working fluid to the fluid-powered tool. A fluid motor is coupled to an electric generator to drive the electric generator. An actuator selectively supplies the pressurized working fluid to the fluid motor. A battery is operatively connected to receive electrical energy from the electric generator. A controller is powered by the battery and is operatively connected to the actuator to control operation of the fluid motor and charging of the battery by the electric generator.

21 Claims, 4 Drawing Sheets

(56) References Cited

U.S. PATENT DOCUMENTS

| | | | |
|---|---|---|---|
| 9,162,719 B2 | 10/2015 | Bowers | |
| 9,222,493 B2* | 12/2015 | Riskas | F15B 21/085 |
| 9,981,377 B2* | 5/2018 | Morin | B25J 9/1075 |
| 10,050,359 B2* | 8/2018 | Kirihara | B25J 19/0029 |
| 2003/0018388 A1* | 1/2003 | Comer | A61F 2/54 |
| | | | 623/14.13 |
| 2007/0168081 A1* | 7/2007 | Shin | B25J 9/08 |
| | | | 700/245 |
| 2008/0174076 A1 | 7/2008 | Eisele | |
| 2008/0293090 A1* | 11/2008 | Powers | G01N 35/028 |
| | | | 435/29 |
| 2009/0187277 A1* | 7/2009 | Bird-Radolovic | B25J 9/1674 |
| | | | 700/245 |
| 2015/0019013 A1* | 1/2015 | Rose | G01L 1/16 |
| | | | 700/258 |
| 2015/0088300 A1 | 3/2015 | Kilibarda | |
| 2016/0082588 A1 | 3/2016 | Hayden | |
| 2016/0181951 A1* | 6/2016 | Qiu | F03G 7/002 |
| | | | 606/1 |
| 2018/0245609 A1* | 8/2018 | Caldwell | F04B 49/06 |

FOREIGN PATENT DOCUMENTS

| | | |
|---|---|---|
| JP | H07184406 A | 7/1995 |
| KR | 101060835 B1 | 8/2011 |

OTHER PUBLICATIONS

"Practical Embedded Security—Part 3: Wireless technologies" by Timothy Stapko (www.embedded.com/print/4019862) Apr. 12, 2010 (6 pages).

"RBC Travels by Remote Control" by Insightstyle/Air Technical Industries (www.airtechnical.com/rbc-travels-remote-control/) Dec. 21, 2009 (3 pages).

* cited by examiner

SYSTEM FOR LOCALLY GENERATING ELECTRICITY ON A ROBOTIC DEVICE

BACKGROUND OF THE INVENTION

Field of the Invention

Embodiments of the present invention relate to systems and methods for powering devices on a moving mechanical assembly such as, for example, an end of arm tool (EOAT) or end effector of a six-axis articulated robot and the like, and, more particularly, to systems and methods for generating power at the point-of-use for powering the devices on the moving mechanical assembly.

Description of Related Art

Moving mechanical assemblies such as, for example, end of arm tools of six-axis articulated robots, automation positioning mechanisms, turntables, and the like require power at the point-of-use for powering devices during operation. For example, an EOAT which is located at the end of a moving robotic arm typically has a number of powered devices that perform needed tasks for the particular application. Power must be provided to those devices at the point-of-use. Many EOATs require pneumatic or hydraulic power to actuate a gripper or the like. Other EOATs require electrical power for devices on the EOAT, such as sensors (e.g., proximity sensors, force sensors, camera vision systems, etc.) and the like.

Articulated robots and other moving mechanical assemblies typically use flexible electrical wires/cables running through the robot to provide electrical power to any devices needing electricity on the EOAT. This wiring is often referred to as "high-flex wiring." This high-flex electrical wiring is expensive and is a common source of failure in many moving devices. Flexible air and hydraulic lines or hoses can typically withstand more repetitive motion than electrical wires without failing. Utilizing slip rings can reduce the number of failures but are even more expensive than the high-flex wiring. Accordingly, there is a need in the industry for improved systems and methods for powering devices on a moving mechanical assembly that lowers production and maintenance costs relative to existing systems and methods.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a robotic device. The robotic device includes a robot arm. A fluid-powered tool is located on the robot arm. A hose supplies a pressurized working fluid to the fluid-powered tool. A fluid motor is coupled to an electric generator to drive the electric generator. An actuator selectively supplies the pressurized working fluid to the fluid motor. A battery is operatively connected to receive electrical energy from the electric generator. A controller is powered by the battery and is operatively connected to the actuator to control operation of the fluid motor and charging of the battery by the electric generator.

In accordance with another aspect of the present invention, provided is a robotic device. The robotic device includes a robot arm, a fluid-powered end of arm tool located on the robot arm, a hose supplying a pressurized working fluid to the fluid-powered end of arm tool, an electric generator, a fluid motor coupled to the electric generator to drive the electric generator, a battery operatively connected to receive electrical energy from the electric generator, a first solenoid valve for selectively supplying the pressurized working fluid to the fluid motor, a second solenoid valve for selectively supplying the pressurized working fluid to the fluid-powered end of arm tool, and a controller powered by the battery and operatively connected to the first solenoid valve to control operation of the fluid motor and charging of the battery by the electric generator, and operatively connected to the second solenoid valve to control operation of the fluid-powered end of arm tool.

In accordance with another aspect of the present invention, provided is a robot system. The robot system includes a robot and a robot controller storing programmed instructions for controlling movements of the robot. The robot includes a fluid-powered tool located on the robot. A hose supplies a pressurized working fluid to the fluid-powered tool. A fluid motor is coupled to an electric generator to drive the electric generator. A battery is operatively connected to receive electrical energy from the electric generator. A first solenoid valve selectively supplies the pressurized working fluid to the fluid motor. A second solenoid valve selectively supplies the pressurized working fluid to the fluid-powered tool. A local controller is powered by the battery and is operatively connected to the first solenoid valve to control operation of the fluid motor and charging of the battery by the electric generator, and is operatively connected to the second solenoid valve to control operation of the fluid-powered tool. A sensor is located on the fluid-powered tool and is operatively connected to the local controller. A wireless transceiver is operatively connected to the local controller. The local controller is configured to communicate sensor information to the robot controller, and to receive control instructions for controlling the operation of the fluid-powered tool from the robot controller, through the wireless transceiver.

In accordance with another aspect of the present invention, provided is a robotic device that includes a robot arm and end of arm tool located on the robot arm. The robotic device includes a means for extracting energy from at least one of the robot arm and the end of arm tool, and a rechargeable battery mounted on one of the robot arm and the end of arm tool and operatively connected to receive electrical energy from said means for extracting energy from at least one of the robot arm and the end of arm tool. A controller is mounted on one of the robot arm and the end of arm tool and is powered by the battery. The controller is configured to control recharging of the battery.

DETAILED DESCRIPTION OF THE INVENTION

Embodiments of the present invention relate to systems and methods for powering devices on a moving mechanical assembly such as, for example, an end of arm tool on a robot. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

Figure 1:
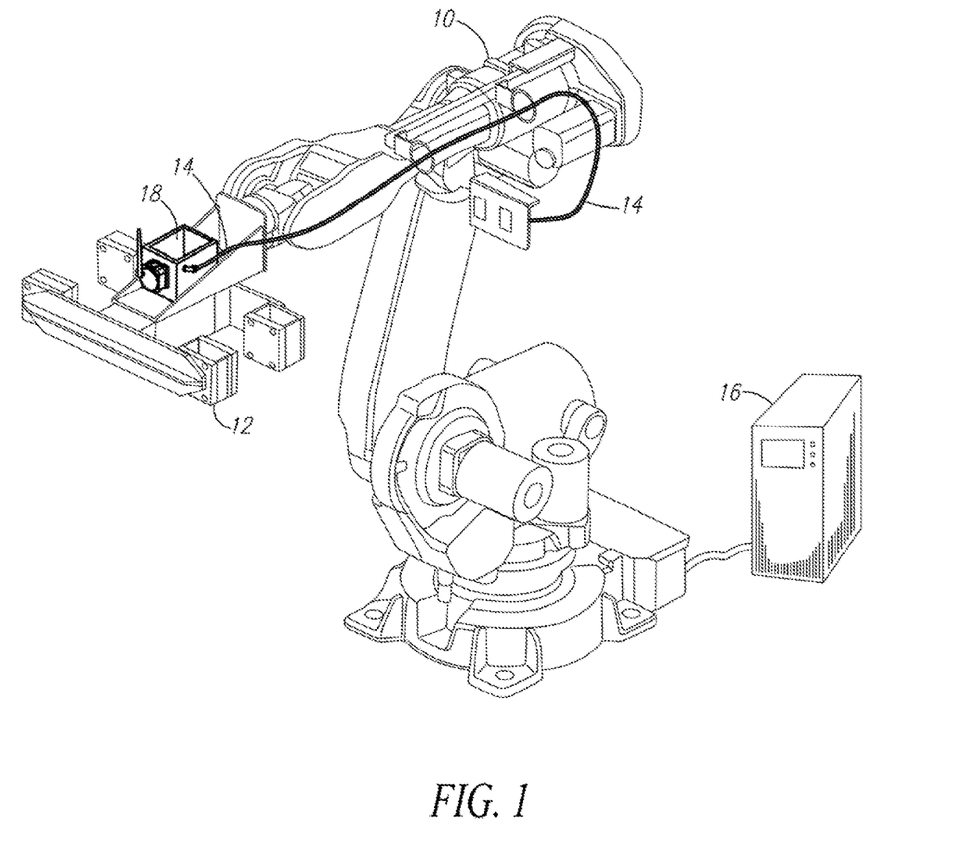
FIG. 1 shows a robot system.

FIGS. 1 through 4 illustrate a system for generating, storing and supplying electric power at a point-of-use on a moving mechanical assembly. In FIG. 1, the illustrated moving mechanical assembly is a robot arm 10, in particular an arm of a six-axis articulating industrial robot. It is noted that the moving mechanical assembly can alternatively be any other suitable type of assembly such as for example, a mechanical turntable, a mechanical positioner, and the like. The illustrated point-of-use is an end of arm tool (EOAT) 12 or end effector mounted on the free or moving end of the robot arm 10. It is noted that the point-of-use can alternatively be any other moving location where electrical power is used, such as on the robot arm to which the EOAT 12 is connected. The EOAT 12 can be of any suitable type of tool having a device requiring electrical power.

The EOAT 12 can be powered by a pressurized working fluid, such as compressed air or hydraulic fluid. A pump (not shown) supplies the working fluid to the EOAT 12 through a hose 14 or other suitable flexible conduit. In FIG. 1, the example EOAT is a gripping device 12 that opens and closes based on the operation of an actuator (e.g., a solenoid valve). A robot controller 16 controls the operation of the robot 10 and EOAT 12 according to stored programmed instructions.

The robot arm 10 or EOAT 12 can require local electrical power to operate sensors, cameras, solenoids, and the like. Rather than supplying such devices through high-flex wiring, the EOAT 12 includes a fluid power unit 18 that includes, among other things, a fluid motor coupled to an electric generator for locally generating electrical power at the point-of-use. The fluid power unit 18 is driven by the pressurized working fluid that powers the EOAT 12. As will be discussed further below, the fluid power unit 18 can include a rechargeable battery for storing generated electrical power, and a controller for controlling operations of the fluid power unit, such as controlling the operation of the fluid motor. The fluid power unit 18 can also include a wireless transceiver for communicating with a remote device, such as the robot controller 16, a programmable logic controller (PLC), etc.

Figure 2:
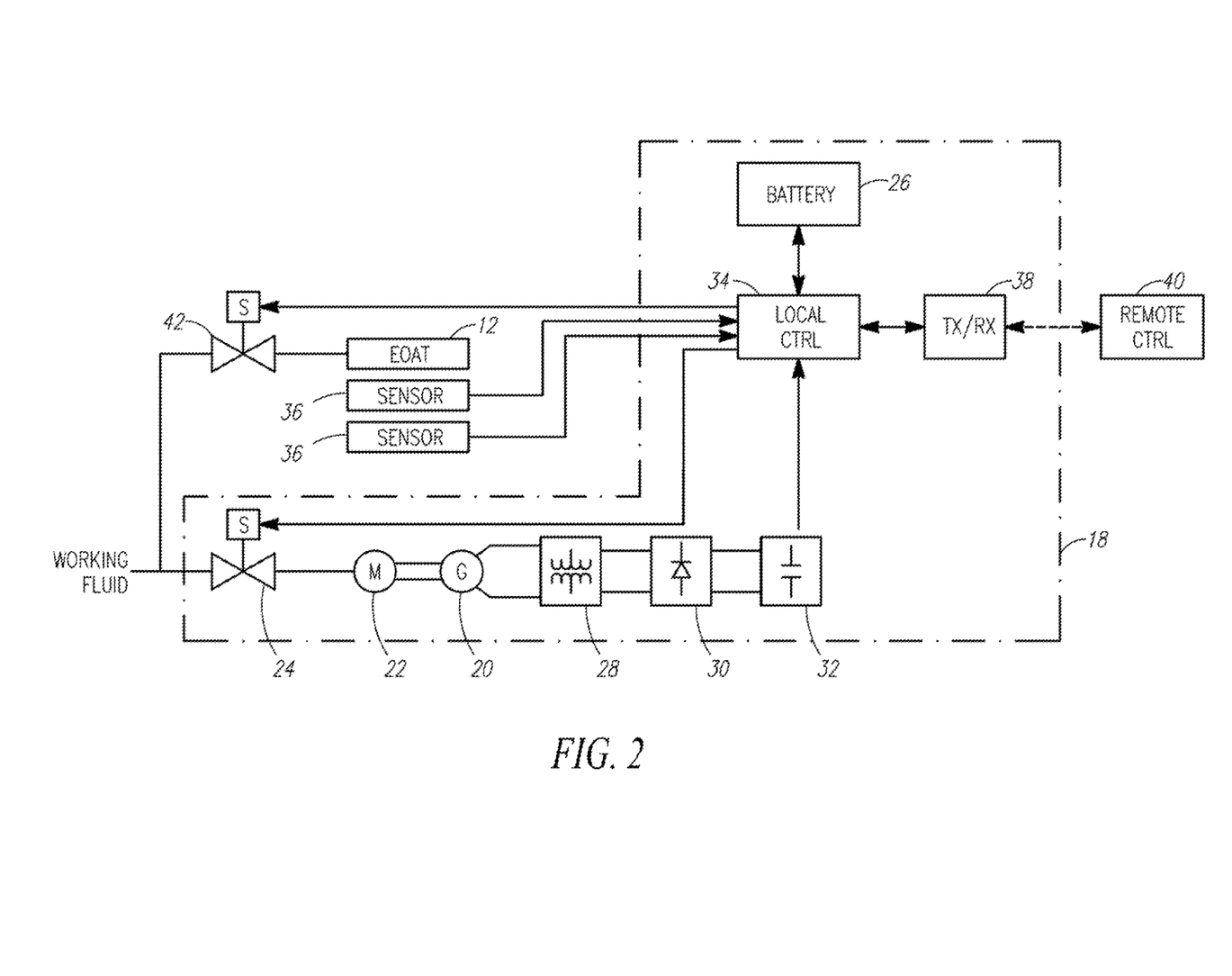
FIG. 2 is a block diagram of a point-of-use power system.

FIG. 2 is a block diagram of a point-of-use power system including the fluid power unit 18. The fluid power unit 18 includes an electric generator 20 coupled to a fluid motor 22 to mechanically drive the electric generator to generate electric power. An electromechanical actuator, such as a solenoid valve 24, selectively supplies pressurized working fluid to the fluid motor 22. The solenoid valve 24 selectively activates and deactivates the fluid motor 22 and, thus, the generator 20. At least one rechargeable battery 26 is operably connected to receive electrical energy from the generator 20. The battery is thus charged by operation of the fluid motor 22 and generator 20.

The illustrated generator 20 is utilized to generate raw electric power from the fluid motor 22. The generator 20 can be directly connected to the fluid motor 22 or connected to the fluid motor through gears to achieve a speed or rotation required for a desired amount of electric power output. The generator 20 can be an AC generator, DC generator, brushed, brushless, etc.

The illustrated fluid motor 22 can be an air motor powered by pressurized air, but alternatively can be a hydraulic motor powered by pressurized hydraulic fluid, or any other suitable type of fluid powered motor. The fluid motor 22 can also alternatively be any other suitable powered rotating mechanism that when coupled to the generator 20, causes electric power to be generated by the generator when desired. A suitable air motor is believed to be model number SM1UP available from Ingersoll Rand.

The battery 26 can include any suitable quantity of rechargeable batteries and the rechargeable batteries can be of any suitable type such as, for example, lithium-ion polymer, NiCad, NiMh, and the like. The battery 26 stores the generated power in order to minimize the air/hydraulic consumption of the system. The generator 20 is typically deactivated and is only activated when necessary to recharge the battery 26 or when power is needed and the battery does not have a suitable charge. Operating in this manner reduces the amount of pressurized working fluid that is used. A suitable battery is believed to be a four cell LiPo battery pack of about 14.8 Volts DC.

The fluid power unit 18 can include a transformer 28 that is supplied by the generator 20, a rectifier 30 and regulator/filter circuitry 32. The regulator/filter circuity 32 can supply generated power to a local controller 34 of the fluid power unit 18. The controller 34 controls the operations and communications (e.g., wireless communications) of the fluid power unit 18.

The controller 34 can be an electronic controller and can include one or more processors. For example, the controller 34 can include one or more of a microprocessor, a microcontroller, a digital signal processor (DSP), an application specific integrated circuit (ASIC), a field-programmable gate array (FPGA), discrete logic circuitry, or the like. The controller 34 can further include memory and may store program instructions that cause the controller to provide the functionality ascribed to it herein. The memory may include one or more volatile, non-volatile, magnetic, optical, or electrical media, such as read-only memory (ROM), random access memory (RAM), electrically-erasable programmable ROM (EEPROM), flash memory, or the like. The controller 34 can further include one or more analog-to-digital (A/D) converters for processing various analog inputs to the controller.

The controller 34 is powered by either one of the battery 26 and the generator 20. The controller 34 can monitor the charge level of the battery 26. The controller 34 is operatively connected to the solenoid valve 24 to activate or deactivate the solenoid valve and, thus, control the operation of the fluid motor 22 and generator 20. The controller 34 can control the operation of the fluid motor 22 based on the charge level of the battery 26. When the battery charge is low, or more power is needed than can be supplied by the battery 26, the controller 34 can activate (e.g., energize) the solenoid valve 24 so that pressurized working fluid is provided to the fluid motor 22, to drive the fluid motor and generator 20. The controller 34 can determine when to activate and deactivate the generator 20 and how long the generator should run while the system is harvesting energy and storing electric power.

The robot arm 10 (FIG. 1) or EOAT 12 can include powered sensors 36 located on the arm or EOAT, such as proximity sensors, pressure sensors, accelerometers, cameras, infrared sensors, and the like. The fluid power unit 18 can power such sensors 36 via the battery 26 and/or generator 20. Signals from the sensors 36 can be received by the controller 34. The fluid power unit 18 can further include a wireless transceiver 38 that is operatively connected to the controller 34. Via the wireless transceiver 38, the controller 34 can communicate with a remote device 40, such as the robot controller 16 (FIG. 1). For example, the controller 34 can relay information provided by the sensors 36 to the remote device 40 and receive control instructions from the remote device. The EOAT 12 can include one or more actuators 42 for selectively supplying the pressurized working fluid to the EOAT and controlling the operation of the EOAT, and the controller 34 can be operatively connected to the one or more actuators to control the operation of the EOAT. The controller 34 can control the operation of the EOAT 12 based on control instructions received from the remote device 40 through the wireless transceiver 38. Example wireless communications performed by the wireless transceiver 38 include Wi-Fi, Bluetooth, cellular communications (e.g., GSM, LTE, etc.), and the like.

In providing power to the sensors 36 or other devices, and when operating the actuators 24, 42, the controller 34 can utilize interposing switching elements, such as transistor switches or relays. The controller 34 can control the operation of such interposing switching elements to control the provision of power to the sensors 36, actuators 24, 42, or other devices from the generator 20 and/or battery 26. The interposing switching elements can be located on a common circuit board with the controller 34.

Figure 3:
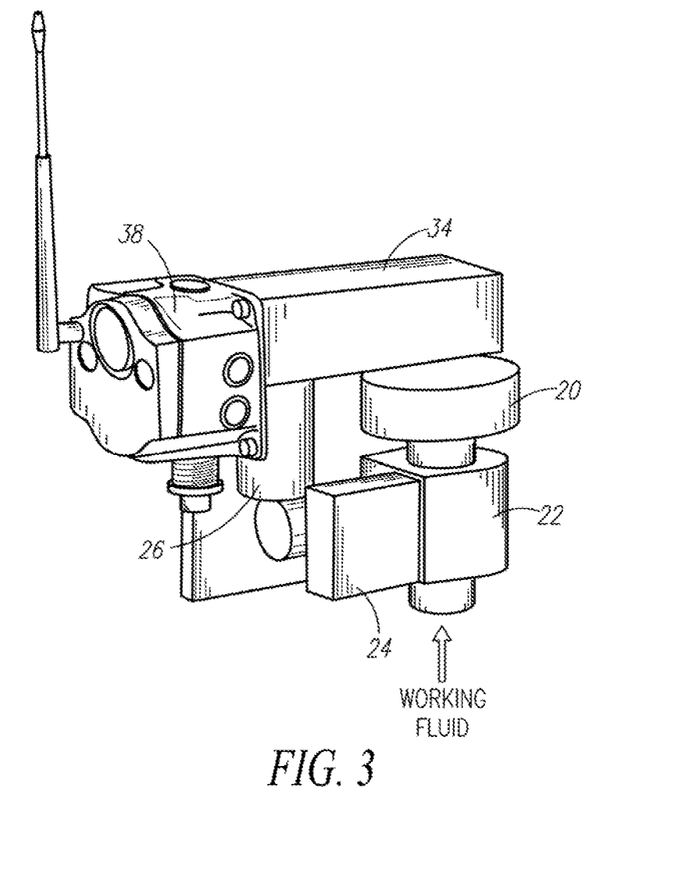
FIG. 3 shows a fluid power unit.

FIG. 3 shows an example fluid power unit 18 that can be mounted on the EOAT 12 or robot arm 10 (FIG. 1). The fluid power unit 18 can be a packaged unit as shown in FIG. 3, with all of the components of the fluid power unit (e.g., solenoid valve 24, fluid motor 22, generator 20, controller 34, battery 26, and transceiver 38) will be mounted together on the EOAT or robot arm. In certain embodiments, portions of the fluid power unit can be mounted on the EOAT and other portions can be mounted on the robot arm.

Figure 4:
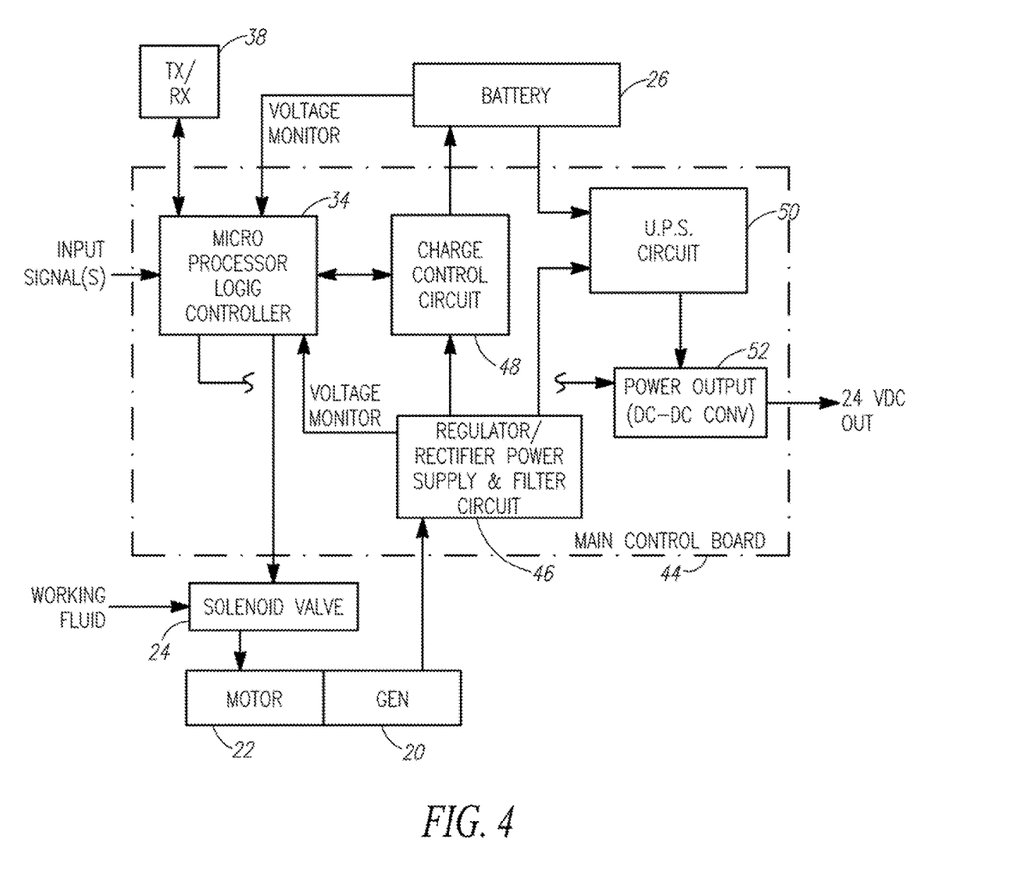
FIG. 4 is a schematic block diagram of the fluid power unit.

FIG. 4 shows a schematic block diagram of an example fluid power unit. The controller 34 can be located on a main control board 44. The main control board 44 can include the transformer, rectifier, and regulator/filter circuitry 46 discussed above. The main control board 44 can further include a charge control circuit 48, an uninterruptable power supply (UPS) circuit 50, and a power output 52 in the illustrated form of a DC-DC step up converter. It is noted that the fluid power unit can alternatively have any other suitable configuration depending on the specific generator and rechargeable batteries utilized and the electric power output desired.

As discussed above, the controller 34 determines when to activate and deactivate the generator 20 and how long the generator should run. The controller 34 can also control the charge control circuit 48 which may be required for some types of rechargeable batteries. The controller 34 can send signals to the solenoid valve 24 and the charge control circuit 48 and can receive signals from the transformer, rectifier, and regulator/filter circuitry 46, the charge control circuit 48, and the at least one battery 26. The controller 34 can also send signals to control power output circuitry 52 (e.g., relays, output switches, etc.), and can send signals to and receive signals from the transceiver 38.

The transformer, rectifier, and regulator/filter circuitry 46 includes electronics required for power generation, such as converting AC electric power output from the generator to DC power having a desired voltage level, and providing additional filtering and regulation. The DC power can then be used to charge the battery 26 and supply power to the UPS circuit 50. The illustrated transformer, rectifier, and regulator/filter circuitry 46 receives input from the generator 20 and sends output to the UPS circuit 50, and to the battery 26 via the charge control circuit 48. The transformer, rectifier, and regulator/filter circuitry 46 can also send a signal to the controller 34 (e.g., for voltage level or generator output monitoring by the controller 34).

The charge control circuit 48 handles the charging of the battery 26 to store the electric power generated by the generator 20. Many different types of rechargeable batteries exist, and some require specialized circuitry to properly recharge. A lithium-ion polymer (LiPo) battery is one example. LiPo batteries have specific recharging requirements, and such requirements can be achieved by utilizing a charge control circuit 48 that monitors the battery 26 as it recharges. It is to be appreciated that the charge control circuit 48 can be eliminated when its functions are not needed. The illustrated charge control circuit 48 receives input from the transformer, rectifier, and regulator/filter circuitry 46 and supplies a recharging output to the battery 26. The charge control circuit 48 can also send signals to the controller 34 and receive control signals from the controller.

The UPS circuit 50 operates such that uninterrupted power is provided to the power output 52. The primary power source is the battery 26 (which is recharged as needed by activating the fluid motor 22 and generator 20), but if the battery's charge runs low, the UPS circuit 50 can automatically switch to generator power.

The power output 52 can include a DC to DC boost converter but can alternatively be of any other suitable type. The DC to DC converter can convert the lower battery voltage (14.8 Volts DC) to a higher desired output voltage (24 Volts DC), or convert the battery voltage to a lower level, or provide both boost and buck functions. The power output 52 can provide output voltage levels suitable for use by the devices intended to be powered by the fluid power unit (e.g., 5 Volts DC, 12 Volts DC, 24 Volts DC, greater than 24 Volts DC, etc.) An example DC-DC convertor is model number VHB50W-Q24-S24 available from V-Infinity a division of CUI Inc.

From the foregoing disclosure it will be apparent that the present invention provides a system and method to harvest power from potential energy means at a point-of-use on a moving mechanical assembly. Also apparent is that this invention can reduce the costs of implementing a wireless communication solution by generating the required power on the moving mechanism itself. Flexible air and hydraulic lines can typically withstand more (than electrical wires) repetitive motion without failing. Also in many cases a pneumatic or hydraulic line or hose is already required on the moving mechanical assembly to actuate grippers and other mechanisms. Utilizing this potential energy that is readily available, the present invention harvests non-electrical power, generates electrical power, controls the generation of said electrical power, and powers any powered devices at the point-of-use on the moving mechanical assembly.

As an alternative to harvesting energy from the working fluid as described above, in certain embodiments energy can be harvested directly from the movements of the robot arm and/or the EOAT. For example, the fluid power unit 18 can include a kinetic generator, such as a "shake" or Faraday generator, that extracts energy from the movements of the robot arm and/or EOAT for recharging the battery. The motion between joints on the robot arm could also be used to drive generators for recharging the battery. Additionally, energy for recharging the battery could be harvested from the back emf produced by one or more of the motors of the robot arm.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A robotic device, comprising:
a robot arm;
a fluid-powered tool located on the robot arm;
a hose supplying a pressurized working fluid to the fluid-powered tool;
an electric generator;
a fluid motor coupled to the electric generator to drive the electric generator;
an actuator for selectively supplying the pressurized working fluid to the fluid motor;
a battery operatively connected to receive electrical energy from the electric generator; and
a controller powered by the battery and operatively connected to the actuator to control operation of the fluid motor and charging of the battery by the electric generator.

2. The robot device of claim 1, further comprising a sensor located on one of the robot arm and the fluid-powered tool and operatively connected to the controller.

3. The robot device of claim 2, further comprising a wireless transceiver operatively connected to the controller, wherein the controller is configured to communicate sensor information to a remote device and receive control instructions from the remote device through the wireless transceiver.

4. The robot device of claim 3, further comprising a second actuator for selectively supplying the pressurized working fluid to the fluid-powered tool, wherein the controller is operatively connected to the second actuator to control operation of the fluid-powered tool based on the control instructions received from the remote device.

5. The robot device of claim 1, wherein the controller is configured to monitor a charge level of the battery and control the operation of the fluid motor based on the charge level of the battery.

6. The robot device of claim 1, further comprising an uninterruptible power supply circuit configured to supply electrical energy from either one of the battery and the electric generator to a power output.

7. The robot device of claim 1, wherein the electric generator, the fluid motor, the battery, and the controller are located on the fluid-powered tool.

8. The robot device of claim 1, wherein the working fluid is compressed air.

9. The robot device of claim 1, wherein the working fluid is hydraulic fluid.

10. A robotic device, comprising:
a robot arm;
a fluid-powered end of arm tool located on the robot arm;
a hose supplying a pressurized working fluid to the fluid-powered end of arm tool;
an electric generator;
a fluid motor coupled to the electric generator to drive the electric generator;
a battery operatively connected to receive electrical energy from the electric generator;
a first solenoid valve for selectively supplying the pressurized working fluid to the fluid motor;
a second solenoid valve for selectively supplying the pressurized working fluid to the fluid-powered end of arm tool; and
a controller powered by the battery and operatively connected to the first solenoid valve to control operation of the fluid motor and charging of the battery by the electric generator, and operatively connected to the second solenoid valve to control operation of the fluid-powered end of arm tool.

11. The robot device of claim 10, further comprising a sensor located on the fluid-powered end of arm tool and operatively connected to the controller.

12. The robot device of claim 11, further comprising a wireless transceiver operatively connected to the controller, wherein the controller is configured to communicate sensor information to a remote device and receive control instructions from the remote device through the wireless transceiver.

13. The robot device of claim 12, wherein the controller is configured to control the operation of the fluid-powered end of arm tool based on the control instructions received from the remote device.

14. The robot device of claim 10, wherein the controller is configured to monitor a charge level of the battery and control the operation of the fluid motor based on the charge level of the battery.

15. The robot device of claim 10, further comprising an uninterruptible power supply circuit configured to supply electrical energy from either one of the battery and the electric generator to a power output.

16. The robot device of claim 10, wherein the electric generator, the fluid motor, the battery, and the controller are located on the fluid-powered end of arm tool.

17. The robot device of claim 10, wherein the working fluid is compressed air.

18. The robot device of claim 10, wherein the working fluid is hydraulic fluid.

19. A robot system, comprising:
a robot; and
a robot controller storing programmed instructions for controlling movements of the robot,
wherein the robot includes:
a fluid-powered tool located on the robot;
a hose supplying a pressurized working fluid to the fluid-powered tool;
an electric generator;
a fluid motor coupled to the electric generator to drive the electric generator;
a battery operatively connected to receive electrical energy from the electric generator;
a first solenoid valve for selectively supplying the pressurized working fluid to the fluid motor;
a second solenoid valve for selectively supplying the pressurized working fluid to the fluid-powered tool;
a local controller powered by the battery and operatively connected to the first solenoid valve to control operation of the fluid motor and charging of the battery by the electric generator, and operatively connected to the second solenoid valve to control operation of the fluid-powered tool;

a sensor located on the fluid-powered tool and operatively connected to the local controller; and a wireless transceiver operatively connected to the local controller, wherein the local controller is configured to communicate sensor information to the robot controller, and to receive control instructions for controlling the operation of the fluid-powered tool from the robot controller, through the wireless transceiver.

20. The robot system of claim 19, wherein the local controller is configured to monitor a charge level of the battery and control the operation of the fluid motor based on the charge level of the battery.

21. A robotic device, comprising:

a robot arm;

an end of arm tool located on the robot arm;

means for extracting energy from at least one of the robot arm and the end of arm tool;

a rechargeable battery mounted on one of the robot arm and the end of arm tool and operatively connected to receive electrical energy from said means for extracting energy from at least one of the robot arm and the end of arm tool; and a controller mounted on one of the robot arm and the end of arm tool and powered by the battery, wherein the controller is configured to control recharging of the battery.

\* \* \* \* \*